(12) United States Patent
Nesbitt et al.

(10) Patent No.: US 12,115,746 B2
(45) Date of Patent: Oct. 15, 2024

(54) CURING MOLD ASSEMBLIES FOR NON-PNEUMATIC TIRES AS WELL AS METHODS OF MANUFACTURE

(71) Applicant: Bridgestone Americas Tire Operations, LLC, Nashville, TN (US)

(72) Inventors: Adam K. Nesbitt, Hartville, OH (US); Sharon E. Reinhardt, Fairlawn, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/559,950

(22) PCT Filed: Jun. 14, 2022

(86) PCT No.: PCT/US2022/072915
§ 371 (c)(1),
(2) Date: Nov. 9, 2023

(87) PCT Pub. No.: WO2022/266612
PCT Pub. Date: Dec. 22, 2022

(65) Prior Publication Data
US 2024/0239067 A1    Jul. 18, 2024

Related U.S. Application Data

(60) Provisional application No. 63/212,196, filed on Jun. 18, 2021.

(51) Int. Cl.
*B29D 30/02* (2006.01)
(52) U.S. Cl.
CPC ................... *B29D 30/02* (2013.01)

(58) Field of Classification Search
CPC ...................................................... B29D 30/02
See application file for complete search history.

(56) References Cited

U.S. PATENT DOCUMENTS

| 3,380,872 A * | 4/1968 | Pouilloux | B29D 30/245 156/416 |
| 2014/0070448 A1 | 3/2014 | Martin et al. | |

(Continued)

FOREIGN PATENT DOCUMENTS

JP    2021030542 A    3/2021

OTHER PUBLICATIONS

International Search Report and Written Opinion dated Oct. 5, 2022 issued by KIPO in connection with corresponding International Application No. PCT/US2022/072915.

*Primary Examiner* — Emmanuel S Luk
*Assistant Examiner* — Elisa H Vera
(74) *Attorney, Agent, or Firm* — Shaun J. Fox; Matthew P. Dugan

(57) ABSTRACT

Mold assemblies include a mold section having a mold axis. The mold assembly includes a curing bladder assembly supported on the mold section in radially-offset relation to the mold axis. The curing bladder assembly includes a bladder wall that defines a bladder chamber. The bladder wall includes first and second end wall portions as well as first and second edge wall portions extending longitudinally between the first and second end wall portions. In some cases, the bladder wall further includes first and second side wall portions extending longitudinally between the first and second end wall portions and laterally between the first and second edge wall portions. Methods of manufacturing non-pneumatic tires that includes mold assemblies are also included.

20 Claims, 12 Drawing Sheets

(56) References Cited

U.S. PATENT DOCUMENTS

| | | |
|---|---|---|
| 2015/0027606 A1 | 1/2015 | Martin |
| 2015/0034225 A1* | 2/2015 | Martin |
| 2019/0016075 A1* | 1/2019 | Covey ................. B29C 43/3642 |
| 2020/0376789 A1* | 12/2020 | Lung ......................... B60C 7/18 |
| 2021/0114312 A1 | 4/2021 | Wilson et al. |

* cited by examiner

CURING MOLD ASSEMBLIES FOR NON-PNEUMATIC TIRES AS WELL AS METHODS OF MANUFACTURE

This application is the National Stage of International Application No. PCT/US2022/072915, filed on Jun. 14, 2022, which claims the benefit of priority from U.S. Provisional Patent Application No. 63/212,196, filed on Jun. 18, 2021, the entire contents of which is hereby incorporated herein by reference.

BACKGROUND

The subject matter of the present disclosure broadly relates to the art of vehicle tire manufacturing and, more particularly, to mold assemblies for curing non-pneumatic tires as well as methods of manufacturing non-pneumatic tires using such mold assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary.

Conventional pneumatic tires include a tire casing with a tread formed on or along the exterior thereof that is configured to engage a roadway or other ground surface. The tire casing includes an annular body formed from a plurality of layers or plies (e.g., radial plies, belt plies) with opposing sidewalls that extend radially inward from along shoulder portions of the annular body to beads forming the radially-inward extent of the sidewalls. The inner surface of the annular body and the opposing sidewalls are covered by an inner liner that defines the tire chamber of a pneumatic tire.

In conventional tire manufacturing processes, an uncured tire carcass and tread assembly is loaded into a mold assembly on a tire curing press. The mold assembly includes a plurality of die segments with an inside surface portion that includes a section of a tread pattern. The mold assembly is closed by the tire curing press, which positions the die segments in abutting engagement with the tread material of the uncured tire assembly. The tire curing press also includes a curing bladder that is positioned inside the mold assembly such that the uncured tire assembly is spaced outward of the curing bladder in an uninflated condition of the curing bladder. During the curing process, the curing bladder is inflated such that the curing bladder extends into the tire chamber of the uncured tire assembly in abutting engagement with the inner liner. While under pressure from the mold assembly and the inflated curing bladder, the tire curing press introduces heat to the uncured tire assembly which vulcanizes or otherwise crosslinks the uncured tire material to form a completed tire.

Notwithstanding the wide usage and overall success of known types and kinds of tire mold assemblies and methods of manufacture, it has been recognized that certain disadvantages exist with known processes that could limit the applicability and/or use thereof in connection with the manufacture of tire assemblies having other structural arrangements, such as so-called non-pneumatic tires, for example. Accordingly, it is believed desirable to develop mold assemblies and methods of manufacture that may aid in overcoming the foregoing and/or other problems and/or disadvantages of known techniques, and/or otherwise advance the manufacture of non-pneumatic tires.

BRIEF DESCRIPTION

One example of a method of manufacturing a non-pneumatic tire assembly in accordance with the subject matter of the present disclosure can include providing a first mold section that includes a longitudinally-extending mold axis. The method can also include supporting a first curing bladder assembly on the first mold section in radially-offset relation to the mold axis. The first curing bladder assembly can include a first bladder wall at least partially formed from elastomeric material. The first bladder wall can at least partially define a first bladder chamber and can include a first end wall portion disposed along the first mold section and a second end wall portion spaced longitudinally from the first end wall portion. The first bladder wall can also include a first edge wall portion extending longitudinally between the first and second end wall portions and a second edge wall portion extending longitudinally between the first and second end wall portions in spaced relation to the first edge wall portion. The first bladder wall can further include first and second side wall portions that can extending longitudinally between the first and second end wall portions and laterally between the first and second edge wall portions. The first side wall portion can include a first outer side surface portion having a concave cross-sectional profile. The second side wall portion can include a second outer side surface portion having a convex cross-sectional profile. The method can also include providing a less-than-fully-cured non-pneumatic tire assembly that includes a plurality of support structures disposed in peripherally-spaced relation to one another and a plurality of spaces disposed in peripherally-spaced relation to one another with one of the plurality of spaces between adjacent ones of the plurality of support structures. The method can further include positioning the less-than-fully-cured non-pneumatic tire assembly along the first mold section such that the first curing bladder assembly is disposed within one of the plurality of spaces and axially coextensive with at least a portion of the less-than-fully-cured non-pneumatic tire assembly. The method can also include inflating the first curing bladder assembly and thereby displacing at least the first edge wall portion and the second edge wall portion outward into engagement with and applying pressure to the less-than-fully-cured non-pneumatic tire assembly. The method can further include curing the non-pneumatic tire assembly.

One example of a mold assembly in accordance with the subject matter of the present disclosure can include a first mold section having a mold axis and dimensioned to receive an associated less-than-fully-cured non-pneumatic tire assembly. The mold assembly can also include a first curing bladder assembly supported on the first mold section in radially-offset relation to the mold axis. The first curing bladder assembly can include a first bladder wall at least partially formed from elastomeric material. The first bladder wall can at least partially define a first bladder chamber. The first bladder wall can include a first end wall portion disposed along the first mold section and a second end wall portion spaced longitudinally from the first end wall portion. The first bladder wall can also include a first edge wall portion extending longitudinally between the first and second end wall portions and a second edge wall portion extending longitudinally between the first and second end wall portions in spaced relation to the first edge surface portion. The first bladder wall can further include first and second side wall portions extending longitudinally between the first and second end wall portions and laterally between the first and second edge wall portions. The first side wall portion can include a first outer side surface portion having a concave cross-sectional profile. The second side wall portion can include a second outer side surface portion having a convex cross-sectional profile.

DETAILED DESCRIPTION

Turning now to the drawings, it is to be understood that the showings are for purposes of illustrating examples of the subject matter of the present disclosure and that the same are not intended to be limiting. Additionally, it will be appreciated that the drawings are not to scale and that portions of certain features and/or elements may be exaggerated for purpose of clarity and/or ease of understanding.

Figure 1:
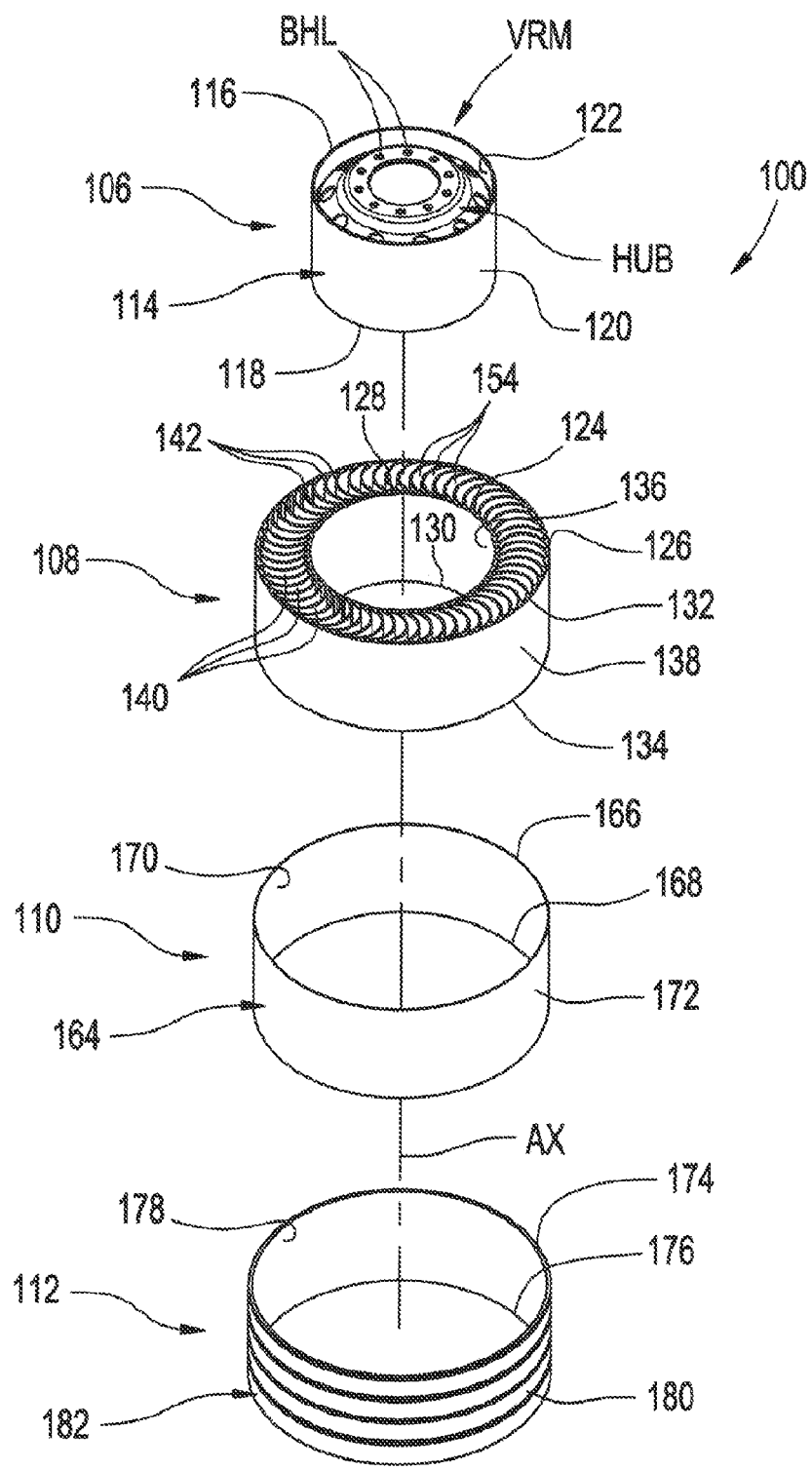
FIG. 1 is an exploded top perspective view of components of an exemplary less-than-fully-cured non-pneumatic tire shown prior to assembly.
Figure 2:
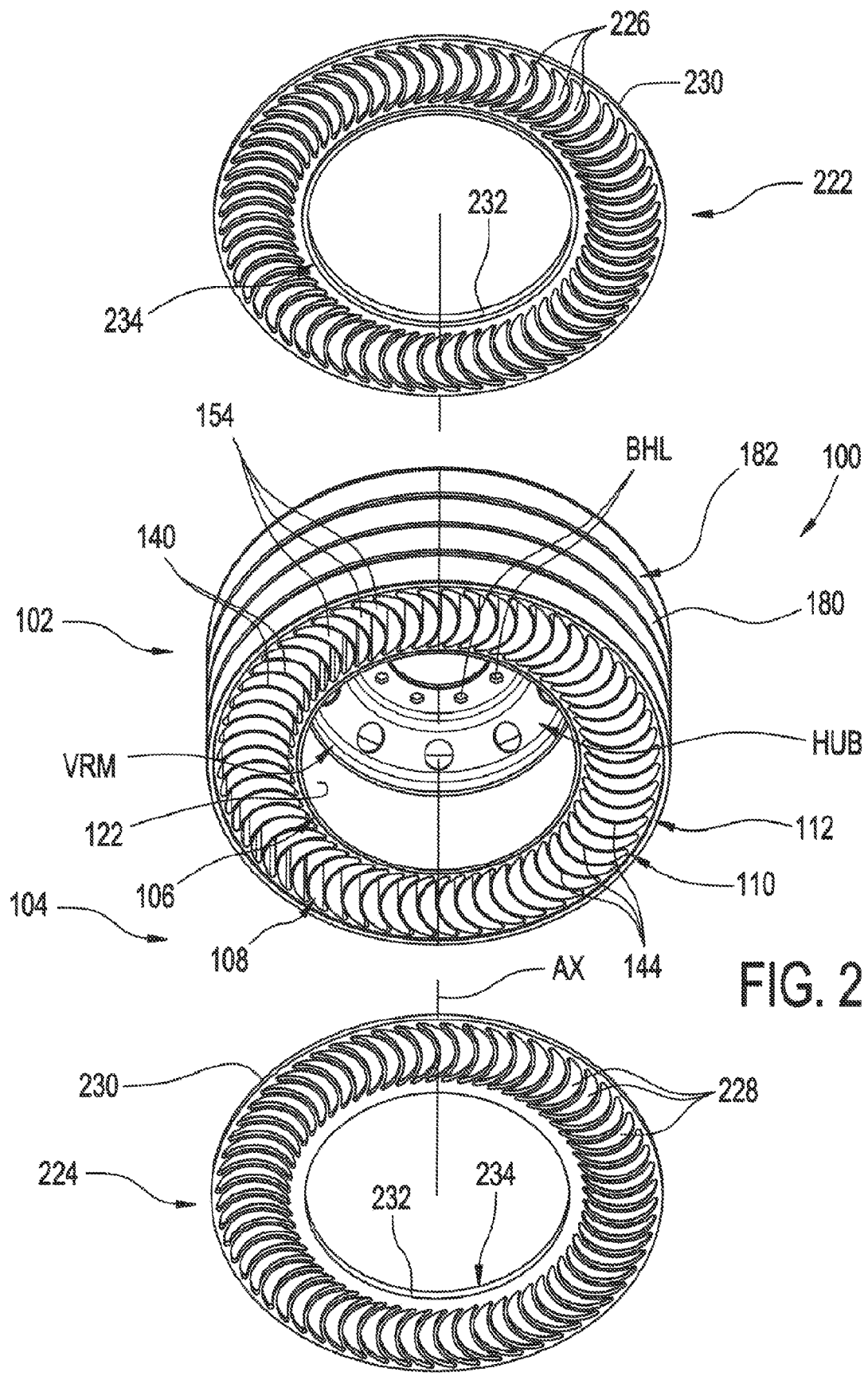
FIG. 2 is a bottom perspective view of the exemplary less-than-fully-cured non-pneumatic tire in an assembled condition and prepared for curing.

FIGS. 1 and 2 illustrate one example of a less-than-fully-cured non-pneumatic tire dimensioned and/or otherwise configured for curing in a mold assembly in accordance with the subject matter of the present disclosure and/or by way of a method of manufacture in accordance with the subject matter of the present disclosure. It will be appreciated that non-pneumatic tires of a various of types, kinds and/or constructions have been developed and/or used in different applications and/or environments. As one non-limiting example, less-than-fully-cured non-pneumatic tire (or tire assembly) 100 is shown in FIGS. 1-5 as having a longitudinal axis AX and can extend axially from an end 102 to an end 104 that is opposite end 102. Less-than-fully-cured non-pneumatic tire 100 can include an annular ring 106 that extends peripherally about axis AX and a structure body 108 that is disposed outwardly of at least a portion of annular ring 106 and also extends peripherally about axis AX. Less-than-fully-cured non-pneumatic tire 100 can also include an annular ring 110 that extends peripherally around axis AX with at least a portion of annular ring 110 disposed outwardly of annular ring 106 and/or structure body 108. Less-than-fully-cured non-pneumatic tire 100 can further include a tread body 112 extending peripherally around axis AX with at least a portion of tread body 112 disposed outwardly of annular ring 110.

It will be appreciated that mold assemblies and methods of manufacture in accordance with the subject matter of the present disclosure are used to transition a non-pneumatic tire having one or more portions formed from a less-than-fully-cured elastomeric material into a non-pneumatic tire in which all or substantially all portions thereof are substantially-entirely cross-linked, vulcanized and/or otherwise cured. As such, it will be appreciated and understood that any one or more of the foregoing components of non-pneumatic tire 100 can include elastomeric material to be transitioned from a less-than-fully-cured condition to at least a substantially-entirely cured condition, and that arrangements of non-pneumatic tire 100 that are shown and described herein are merely exemplary and not intended to be limiting.

It will be appreciated that annular ring 106 can be of any suitable size, shape and/or configuration, and can include any suitable number of one or more walls and/or wall portions. As one non-limiting example, the annular ring could be a part of or otherwise at least partially form an outer wall or outer wall portion of a vehicle wheel or rim, such as is represented in FIGS. 1 and 2 by reference characters VRM. In such an exemplary arrangement, annular ring 106 can include a ring wall (or ring wall portion) 114 extending peripherally around longitudinal axis AX. Optionally, annular ring 106 can include a hub wall (or hub wall portion) HUB disposed inwardly of ring wall portion 114. If included, hub wall portion HUB can be operatively connected to ring wall portion 114. Additionally, if included, hub wall portion HUB can, optionally, be dimensioned and/or otherwise adapted for mounting in a conventional manner on or along an associated component or device, such as an axle of an associated vehicle by way of bolt holes BHL, for example.

Ring wall portion 114 of annular ring 106 can extend axially between a ring edge 116 disposed toward end 102 and a ring edge 118 that is disposed toward end 104 in axially-spaced relation to ring edge 116. Ring wall portion 114 can include an outer surface portion 120 that faces radially outward and extends peripherally about longitudinal axis AX and axially between ends 102 and 104. In some cases, ring wall portion 114 can, optionally, include an inner surface portion 122 that extends peripherally about longitudinal axis AX and faces radially inward axially along and/or between end 102 and/or end 104.

Structure body 108 can include an inner wrap or layer 124 and an outer wrap or layer 126 disposed radially outward of inner layer 124. Inner and outer layers 124 and 126 extend axially between ends 102 and 104 with inner layer 124 extending axially between edges 128 and 130 and outer layer 126 extending axially between edges 132 and 134. In some cases, inner and outer layers 124 and 126 can be substantially coextensive with one another such that edges 128 and 132 are at least approximately aligned with one another along end 102 and edges 130 and 134 are at least approximately aligned with one another along end 104. Inner layer 124 can at least partially define an inside surface portion 136 of structure body 108 that extends peripherally around longitudinal axis AX and axially between ends 102 and 104. Outer layer 126 can at least partially define an outer surface portion 138 of structure body 108 that extends peripherally around longitudinal axis AX and axially between ends 102 and 104.

Structure body 108 also includes a plurality of support structures 140 that extend between and operatively interconnect inner and outer layers 124 and 126. It will be appreciated that support structures 140 can be of any suitable shape, configuration and/or arrangement, and can be operatively connected to inner and outer layers 124 and 126 in any suitable manner. As one non-limiting example, support structures 140 can extend axially from an edge 142 disposed toward end 102 to an edge 144 disposed toward end 104. Support structures 140 can also include an end 146 disposed toward inner layer 124 and an end 148 disposed toward outer layer 126 in spaced relation to end 146. Support structures 140 are shown and described herein as having a curved or otherwise non-linear profile along a plane taken transverse to longitudinal axis AX. Support structures 140 are shown and described as having a concave surface portion 150 facing one circumferential direction about longitudinal axis AX and a convex surface portion 152 facing the opposite circumferential direction. It will be appreciated, however, that such configurations are merely exemplary and that support structures with other shapes and/or profiles could alternately be used without departing from the subject matter of the present disclosure.

Support structures 140 are disposed in peripherally-spaced relation to one another around longitudinal axis AX such that a plurality of spaces 154 are also disposed in peripherally-spaced relation to one another around the longitudinal axis with one of spaces 154 disposed between adjacent ones of support structures 140. In such an arrangement, spaces 154 can have an arcuate, curved or otherwise approximately crescent-shaped cross-sectional profile or configuration with concave surface portion 150 of one support structure 140 and convex surface portion 152 of an adjacent support structure 140 at least partially defining peripherally-spaced sides of spaces 154. In some cases, support structures 140 can extend into or otherwise be at least partially embedded within inner layer 124 and/or outer layer 126. In such cases, a portion 156 of inner layer 124 can at least partially define an end surface portion 158 of spaces 154, such as may have a curved or otherwise non-linear cross-sectional shape and/or configuration. Additionally, or in the alternative, a portion 160 of outer layer 126 can at least partially define an end surface portion 162 of spaces 154, such as may have a curved or otherwise nonlinear cross-sectional shape and/or configuration.

It will be appreciated that annular ring 110 can be of any suitable size, shape and/or configuration, and can include any suitable number of one or more walls and/or wall portions. As one non-limiting example, annular ring 110 can include a ring wall (or ring wall portion) 164 extending peripherally around longitudinal axis AX. Ring wall portion 164 can extend axially between a ring edge 166 disposed toward end 102 and a ring edge 168 that is disposed toward end 104 in axially-spaced relation to ring edge 166. Ring wall portion 164 can include an inner surface portion 170 that faces radially inward and extends peripherally about longitudinal axis AX and axially along and/or otherwise between ends 102 and 104. Ring wall portion 164 can also include an outer surface portion 172 that extends peripherally about longitudinal axis AX and faces radially outward axially along and/or between end 102 and/or end 104.

Tread body 112 can extend axially between ends 102 and 104 with a tread edge 174 disposed along end 102 and a tread edge 176 disposed along end 104. Tread body 112 can also include an inside surface portion 178 that faces radially inward and an outer surface portion 180 that faces radially outward. One or more tread structures 182 (e.g., grooves, ribs, lugs, sipes) can, optionally, be pre-formed on or otherwise extend into tread body 112 from along outer surface portion 180 of less-than-fully-cured non-pneumatic tire 100 with such tread structures adapted during the curing process to at least partially define a ground-engaging tread (or tread pattern) on the cured non-pneumatic tire.

As discussed above, one or more walls and/or wall portions of non-pneumatic tire 100 can be formed from an elastomeric material that is in a less-than-fully-cured condition such that at least these walls and/or wall portions are curable using a mold assembly and/or method of manufacture in accordance with the subject matter of the present disclosure. For example, tread body 112 can be at least partially formed from a less-than-fully-cured elastomeric material. Additionally, or in the alternative, one or more of inner layer 124 and/or outer layer 126 of structure body 108 can be at least partially formed from a less-than-fully-cured elastomeric material. As a further example, and/or as another alternative, support structures 140 can, optionally, include one or more layers of less-than-fully-cured elastomeric material. As non-limiting examples of such constructions, support structures 140 can, in some cases, be at least partially formed from sheets of comparatively-rigid material (e.g., metal, fiber-reinforced composite) of which ends 146 and 148 can, respectively, be at least partially embedded or otherwise disposed within inner and outer layers 124 and 126 of structure body 108. Additionally, or in the alternative, a layer of less-than-fully-cured elastomeric material can extend along and/or at least partially define concave surface portion 150 and/or convex surface portion 152. As another non-limiting example, support structures 140 can be at least partially formed from a plurality of comparatively-rigid wires and/or filaments arranged adjacent one another and at least partially embedded in a quantity of less-than-fully-cured elastomeric material to at least partially form a sheet-like structure.

It will be appreciated that less-than-fully-cured non-pneumatic tire 100 can include any suitable elastomeric material or combination of elastomeric materials, such as natural rubbers, synthetic rubbers and/or thermoplastic elastomers, for example. Additionally, it will be recognized and appreciated, in some cases, a variety of components can be formed from a common less-than-fully-cured elastomeric material. In other cases, however, less-than-fully-cured elastomeric materials of two or more compositions, compounds and/or grades can be used. Terms such as "less-than-fully-cured," and the like, as used herein refer to elastomeric materials having polymer chains that become cross-linked or otherwise bonded when subjected to heat, pressure and/or chemical compounds with "fully cured" or "substantially fully cured" elastomeric materials exhibiting substantially different material and/or mechanical properties than "less-than-fully-cured" elastomeric materials. One non-limiting example of a suitable curing process includes vulcanization of natural and synthetic rubber elastomers.

It will be appreciated that any combination of one or more less-than-fully-cured elastomeric materials can be used or otherwise included in a less-than-fully-cured non-pneumatic tire (e.g., non-pneumatic tire 100). As one non-limiting example, less-than-fully-cured non-pneumatic tire 100 can include one or more quantities of elastomeric material substantially all of each of which is in a "green" or substantially-entirely uncured condition. As another non-limiting example, less-than-fully-cured non-pneumatic tire 100 can include one or more quantities of elastomeric material that is/are in a "green" or substantially-entirely uncured condition and one or more quantities of elastomeric material that is/are in an at least partially cured condition. As a further non-limiting example, less-than-fully-cured non-pneumatic tire 100 can include one or more quantities of elastomeric material that is/are in a partially but not entirely cured condition. As such, it is to be recognized and appreciated that less-than-fully-cured non-pneumatic tire 100 can include, without limitation: one or more quantities of "green" or substantially-entirely uncured elastomeric material; or, one or more quantities of partially but not fully cured elastomeric material; or, both one or more quantities of "green" or substantially-entirely uncured elastomeric material and one or more quantities of partially but not fully cured elastomeric material.

Figure 3:
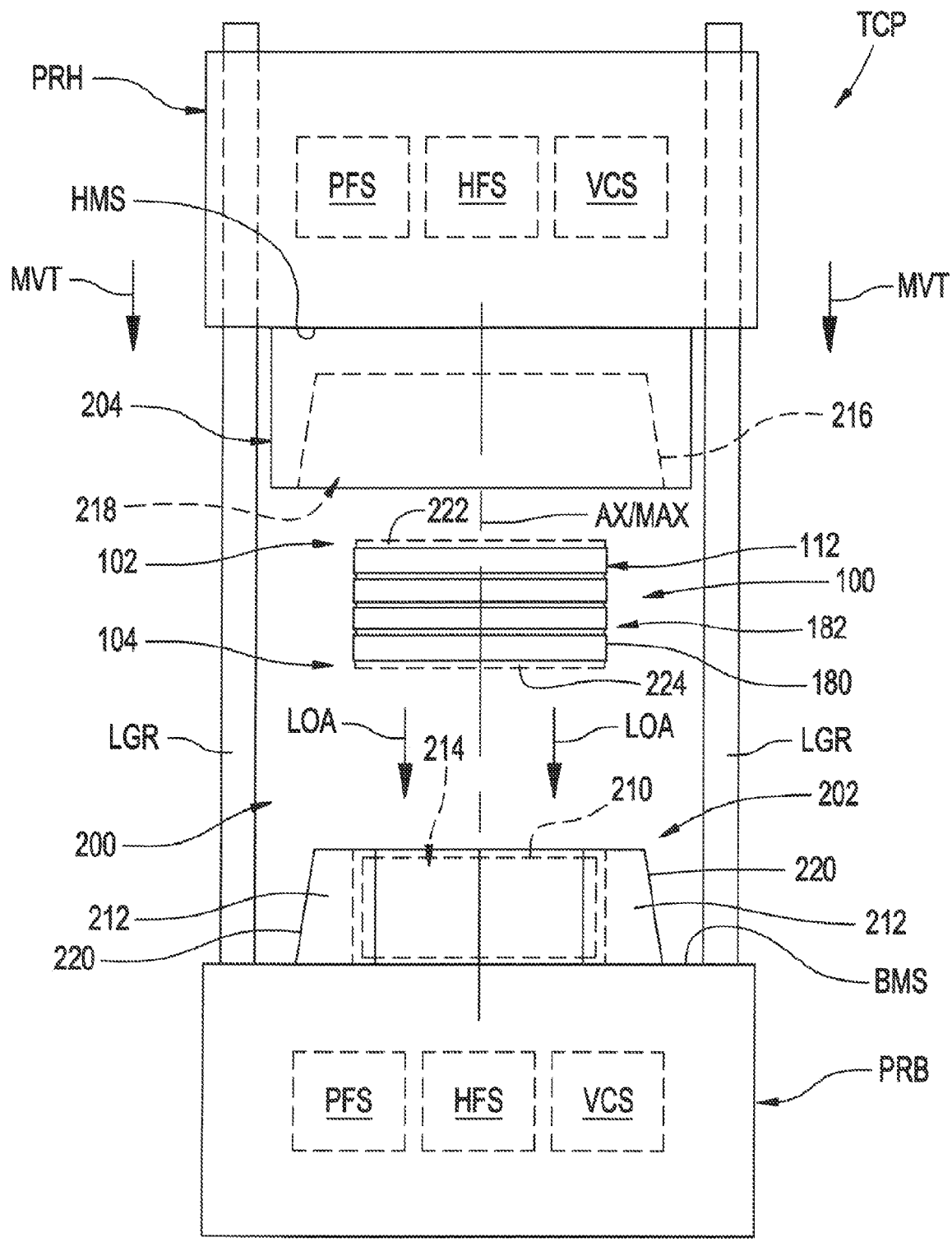
FIG. 3 is a front elevation view of a tire curing press shown with a mold assembly in an open condition and the exemplary less-than-fully-cured non-pneumatic tire being loaded.
Figure 4:
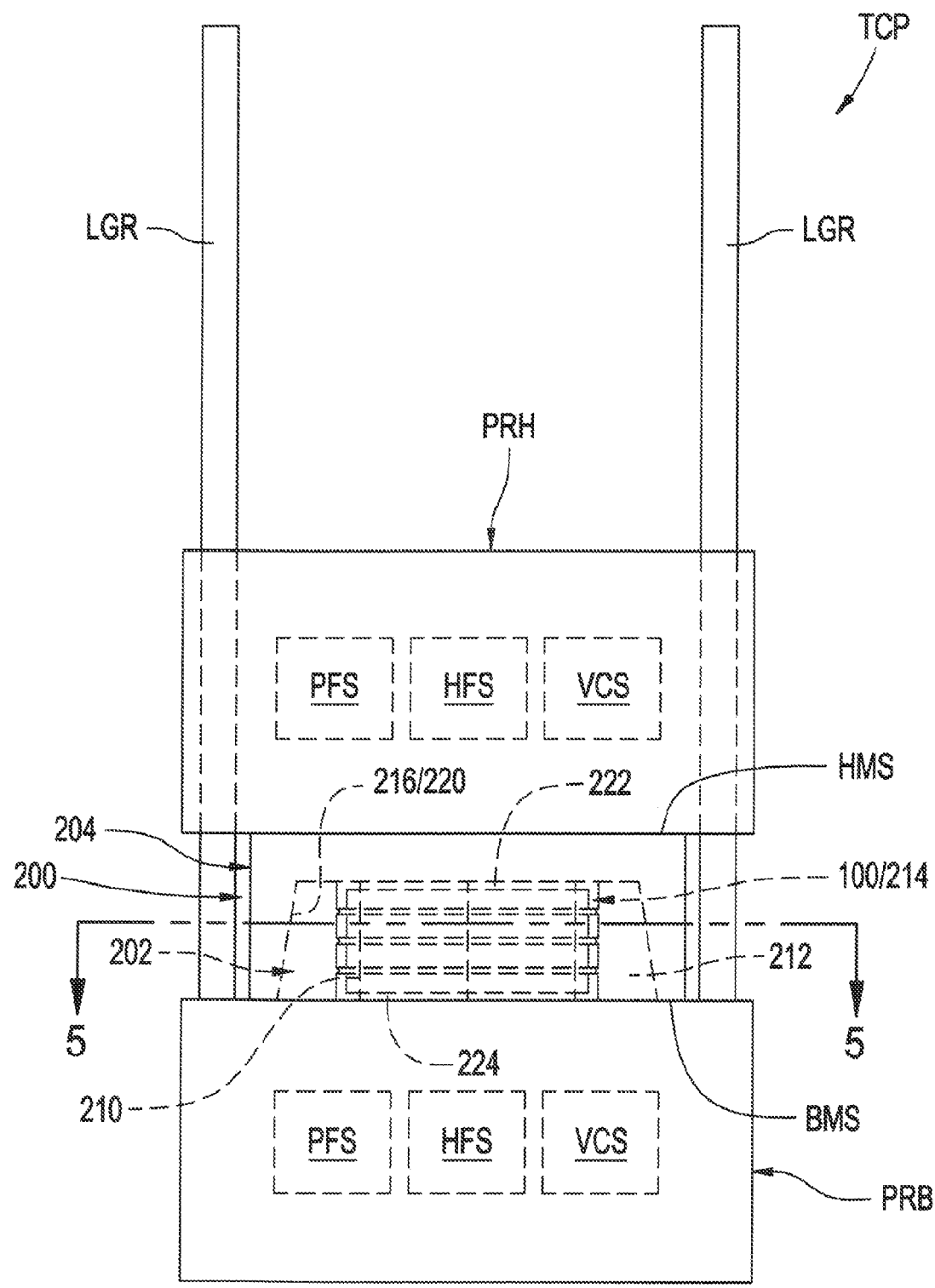
FIG. 4 is a front elevation view of the tire curing press of FIG. 3 shown with the mold assembly in a closed condition and the exemplary less-than-fully-cured non-pneumatic tire loaded for curing.

FIGS. 3 and 4 schematically illustrate an otherwise conventional tire curing press TCP that includes a press base PRB with a base mounting surface BMS. Tire curing press TCP also includes a press head PRH with a head mounting surface HMS. Press head PRH is moveable relative to press base PRB, such as along linear guide rods LGR, for example, in a conventional manner. Press head PRH is shown in FIG. 3 as being disposed in a first or raised position that is moveable to a second or lowered position shown in FIG. 4, which movement is represented in FIG. 3 by arrows MVT. Tire curing press TCP can include one or more pressurized fluid sources, one or more heated fluid sources and/or one or more vacuum sources, such as are schematically represented in FIGS. 3 and 4 by dashed boxes PFS, HFS and VCS, respectively, and can be included on, along or be otherwise operatively associated with press base PRB and/or press head PRH, as is well known in the art.

A mold assembly 200 in accordance with the subject matter of the present disclosure is shown in FIGS. 2-10 as being operatively supported within or otherwise on or along tire curing press TCP. Mold assembly 200 includes a mold section 202 that is supported on or along base mounting surface BSM of press base PRB and a mold section 204 that is supported on or along head mounting surface HMS of press head PRH. Mold section 202 can be operatively connected in fluid communication with pressurized fluid source PFS, heated fluid source HFS and/or vacuum source VCS of press base PRB in any manner suitable for transferring pressurized fluid and/or heated fluid to and/or from the mold section, such as by way of one or more conduits or passages 206, for example. Additionally, or in the alternative, mold section 204 can be operatively connected in fluid communication pressurized fluid source PFS, heated fluid source HFS and/or vacuum source VCS of press head PRH in any manner suitable for transferring pressurized fluid and/or heated fluid to and/or from the mold section, such as by way of one or more of conduits or passages 208, for example.

Mold assembly 200 includes a mold axis MAX extending in or otherwise along the direction of movement MVT of tire curing press TCP. As such, mold sections 202 and 204 are axially displaceable relative to one another during operation of the tire curing press with mold sections 202 and 204 shown spaced apart in FIG. 3 representing an open condition of the mold assembly and with mold sections 202 and 204 shown coextensively engaged with one another in FIG. 4 representing a closed condition of the mold assembly. Mold section 202 includes an interstitial curing system 210 and a plurality of tread die segments 212 that are disposed peripherally about interstitial curing system 210 to at least partially define a mold cavity 214 within mold section 202. Mold section 204 includes a surface portion 216 that at least partially defines a mold cavity 218 within the mold section. Mold cavity 218 is dimensioned to receive at least a portion of mold section 202 in a closed condition of the mold assembly. In some cases, an outer surface portion 220 of tread die segments 212 can abuttingly engage surface portion 216 of mold section 204 as the mold sections move toward the closed condition.

Figure 5:
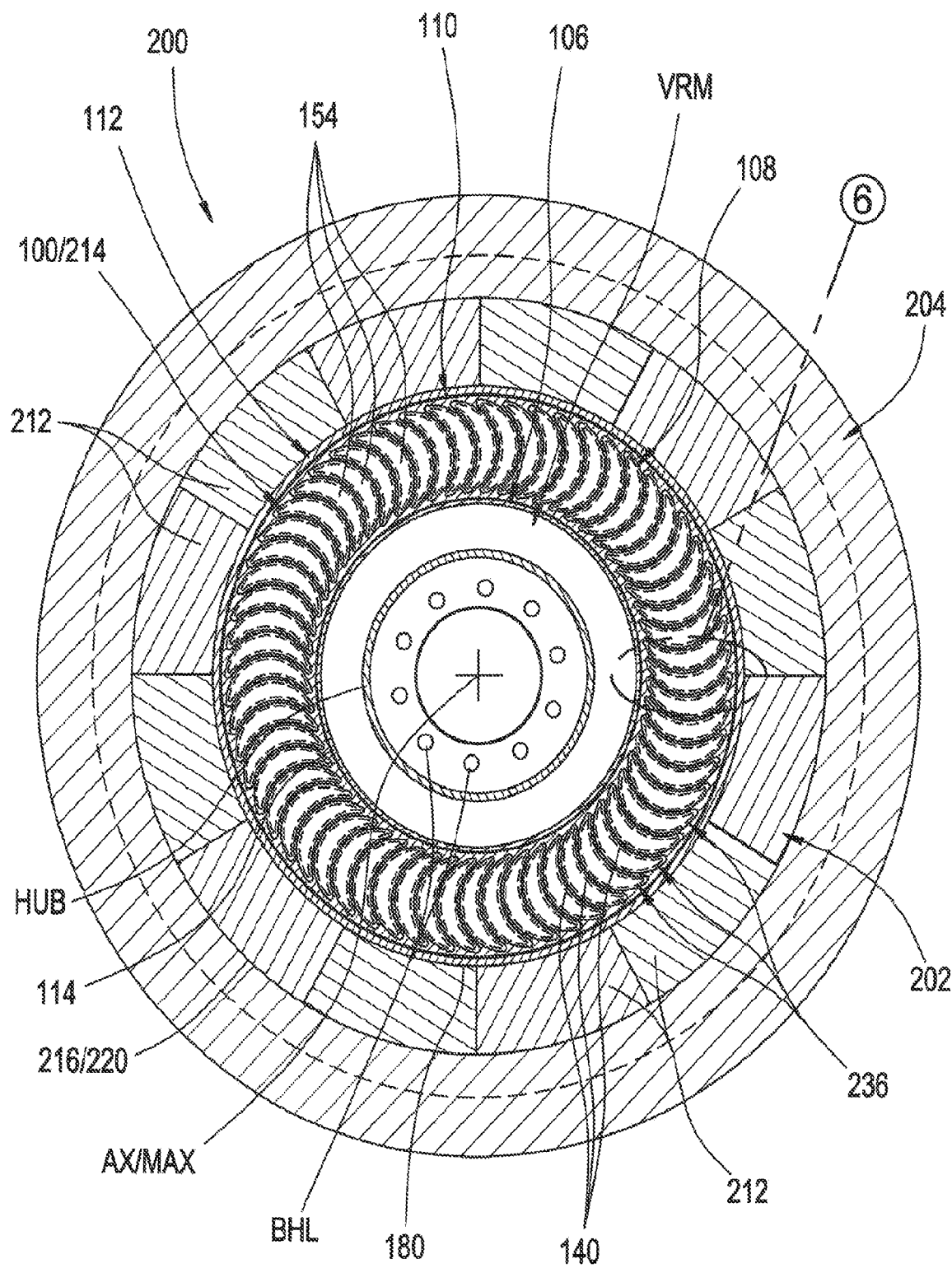
FIG. 5 is a cross-sectional top plan view of the mold assembly and exemplary less-than-fully-cured non-pneumatic tire taken from along line 5-5 in FIG. 4.
Figure 6:
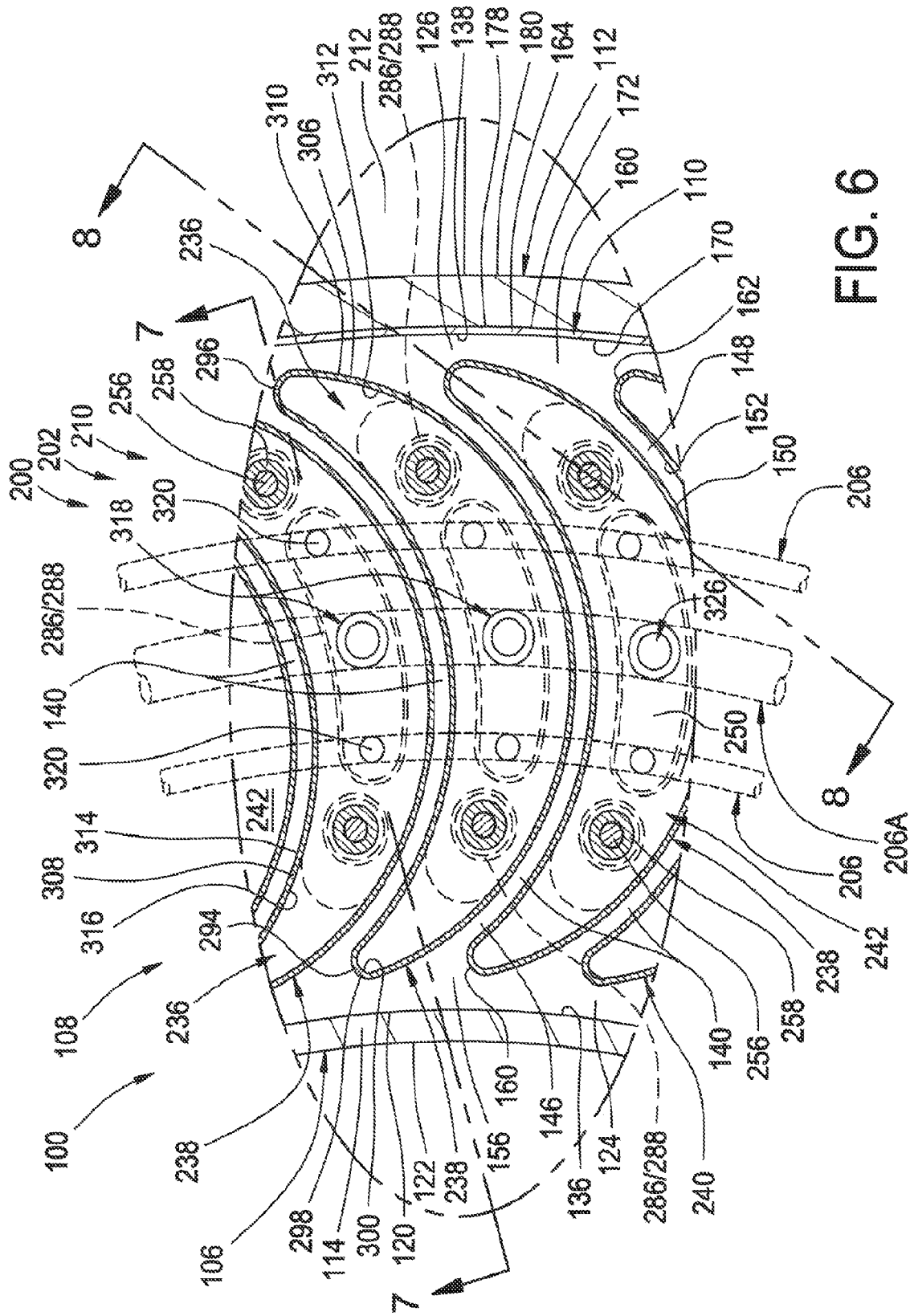
FIG. 6 is an enlarged view of the portion of the mold assembly and exemplary less-than-fully-cured non-pneumatic tire identified as Detail 6 in FIG. 5.

For example, with a less-than-fully-cured non-pneumatic tire 100 loaded into or otherwise positioned at least partially within mold cavity 214, as is represented in FIG. 3 by arrows LOA and shown in FIGS. 4 and 5, tread die segments 212 are displaced radially inward into engagement with tread body 112 of less-than-fully-cured non-pneumatic tire 100. Such radial compression urges inside surface portion 178 of tread body 112 into engagement with outer surface portion 172 of annular ring 110. Additionally, such radial compression urges inner surface portion 170 of annular ring 110 into engagement with outer surface portion 138 of structure body 108. In some cases, such radial compression can also urge inside surface portion 136 of structure body 108 into engagement with outer surface portion 120 of annular ring 106. Furthermore, tread die segments 212 include features formed therealong generally opposite surface portion 220 that extend into engagement with tread body 112 from along outer surface portion 180 thereof under such radial compression to at least partially define ground-engaging tread pattern (e.g., grooves, ribs, lugs, sipes) on or along non-pneumatic tire 100.

As shown in FIGS. 2-4, in some cases, a support plate 222 can be disposed along end 102 of less-than-fully-cured non-pneumatic tire 100. Additionally, or in the alternative, a support plate 224 can be disposed along end 104 of less-than-fully-cured non-pneumatic tire 100. If included, support plate 222 and/or 224 can aid in maintaining annular ring 106, structure body 108, annular ring 110 and/or tread body 112 in a desired axial position relative to one another (e.g., approximate axial alignment), such as during transport to tire curing press TCP, loading/unloading of non-pneumatic tire 100 into and/or out of mold assembly 200 (or a mold section thereof), and/or to rotationally index or otherwise position support structures 140 and/or spaces 154 around longitudinal axis AX relative to interstitial curing system 210 and/or other features of mold assembly 200. If included, support plates 222 and/or 224 can include a plurality of openings 226 and 228, respectively, that have a shape, configuration and/or arrangement complementary to support structures 140 and/or spaces 154 of less-than-fully-cured non-pneumatic tire 100 (e.g., radially offset from axis AX and disposed at a common peripheral spacing). As such, support plates 222 and/or 224, if included, together with non-pneumatic tire 100 can be positioned within mold cavity 214 and/or can be operatively engaged co-extensively with interstitial curing system 210. Support plates 222 and 224 also include an outer peripheral edge 230 that has, in a preferred arrangement, an outer cross-sectional dimension that is approximately equal to or less the outermost cross-sectional dimension of non-pneumatic tire 100 (e.g., diametrically across tread body 112). Additionally, in some cases, support plates 222 and 224 can, optionally, include an inner peripheral edge 232. Furthermore, in some cases, support plates 222 and 224 can, optionally, include an alignment ridge 234 dimensioned to operatively engage a portion of less-than-fully-cured non-pneumatic tire 100 (e.g., inner surface portion 122 of annular ring 106) such that alignment ridge 234 is axially coextensive with a portion of the non-pneumatic tire.

As shown in FIGS. 5-11, interstitial curing system 210 includes a plurality of curing bladder assemblies 236, represented by dashed lines in FIG. 5, that are positioned or otherwise disposed radially offset from mold axis MAX and arranged in peripherally-spaced relation to one another around the mold axis. In a preferred arrangement, curing bladder assemblies 236 are arranged such that one or more of the curing bladder assemblies is disposed within one of spaces 154 when less-than-fully-cured non-pneumatic tire 100 is positioned within mold cavity 214. In such an arrangement, curing bladder assemblies 236 can be selectively actuated and de-actuated such that the curing bladder assemblies correspondingly engage and disengage one or more walls and/or wall portions of structure body 108. In an engaged condition, the curing bladder assemblies can apply surface pressure and/or transfer heat into structure body 108, such as may operate to transition one or more walls and/or wall portions of the structure body that are formed from a less-than-fully-cured elastomeric material into a substantially-cured elastomeric material.

That is, in an actuated condition, curing bladder assemblies 236 can abuttingly engage and thereby apply pressure and/or transfer heat to inner layer 124 of structure body 108. In such an arrangement, the application of pressure by the curing bladder assemblies urges the inner layer toward annular ring 106. Additionally, or in the alternative, curing bladder assemblies 236 can, in an actuated condition, abuttingly engage and thereby apply pressure and/or transfer heat to outer layer 126 of structure body 108. In such an arrangement, the application of pressure by the curing bladder assemblies urges the outer layer toward annular ring 110. Furthermore, and/or as another alternative, curing bladder assemblies 236 can, in an actuated condition, abuttingly engage and thereby apply pressure and/or transfer heat to support structures 140 with adjacent curing bladder assemblies 236 applying pressure and/or transferring heat to the support structure disposed therebetween. In some cases, curing bladder assemblies 236 can apply pressure and/or heat on or along ends 146 and/or 148 of the support structure thereby ensuring ends 146 and/or 148 are in embedded engagement with inner and outer layers 124 and 126, respectively.

It will be appreciated that curing bladder assemblies in accordance with the subject matter of the present disclosure can be of any suitable type, kind and/or configuration, and can be operatively connected on and/or along mold section 202 and/or 204 in any suitable manner. As one non-limiting example of a suitable construction, curing bladder assemblies 236 can include a bladder 238 that is supported on one of mold sections 202 and 204 and extends toward the other of the mold sections. In some cases, each of curing bladder assemblies 236 and bladders 238 thereof can be supported on or along mold section 202. In other cases, each of curing bladder assemblies 236 and bladders 238 thereof can be supported on or along mold section 204. In still other cases, one or more of curing bladder assemblies 236 and bladders 238 thereof can be supported on or along mold section 202 with the remainder of curing bladder assemblies 236 and bladders 238 thereof supported on or along mold section 204, such as in an alternating or interleaved arrangement, for example.

Figure 7:
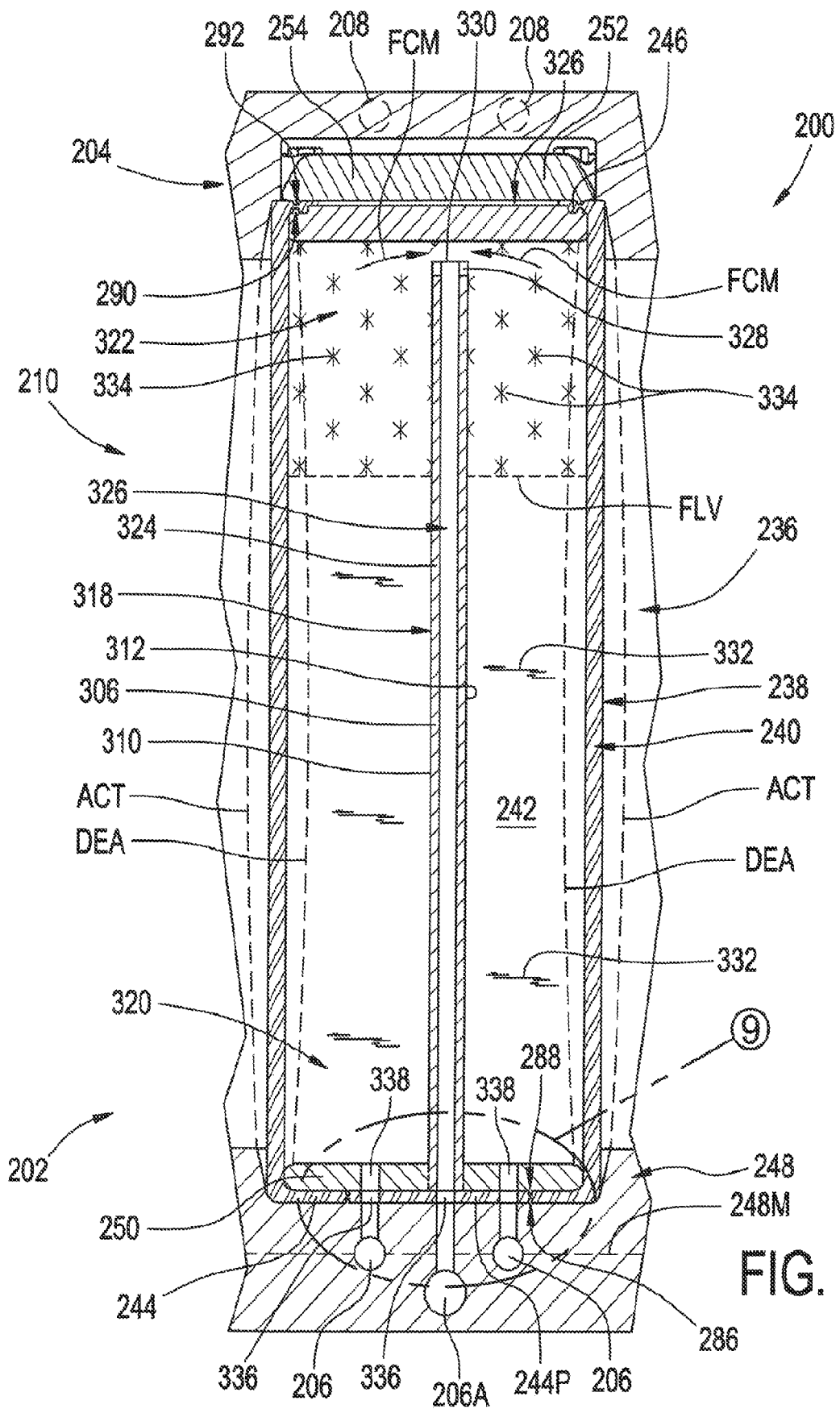
FIG. 7 is a cross-sectional side view of the mold assembly and exemplary less-than-fully-cured non-pneumatic tire in FIGS. 1-6 taken from along line 7-7 in FIG. 6.
Figure 8:
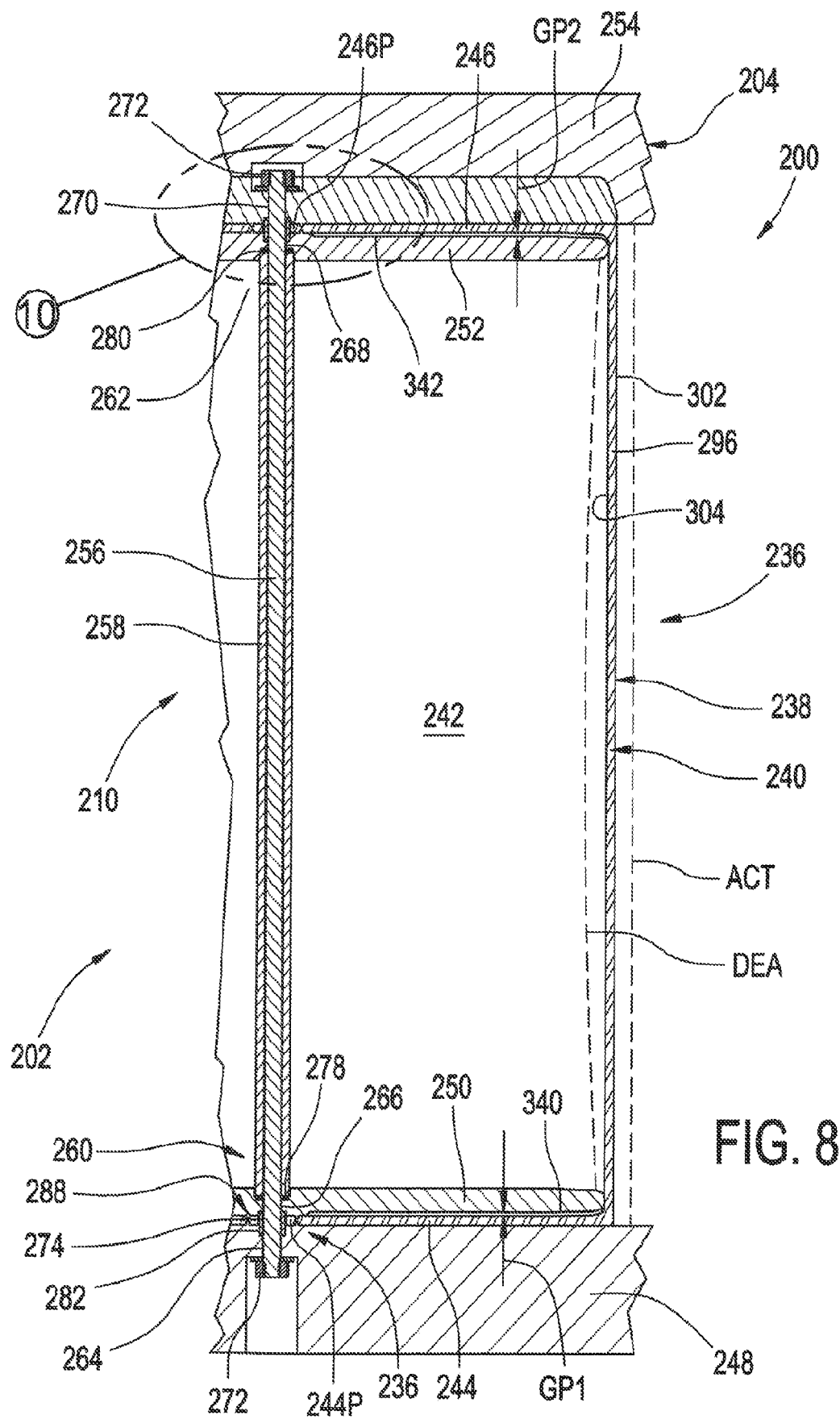
FIG. 8 is a cross-sectional side view of the mold assembly and exemplary less-than-fully-cured non-pneumatic tire in FIGS. 1-7 taken from along line 8-8 in FIG. 6.
Figure 9:
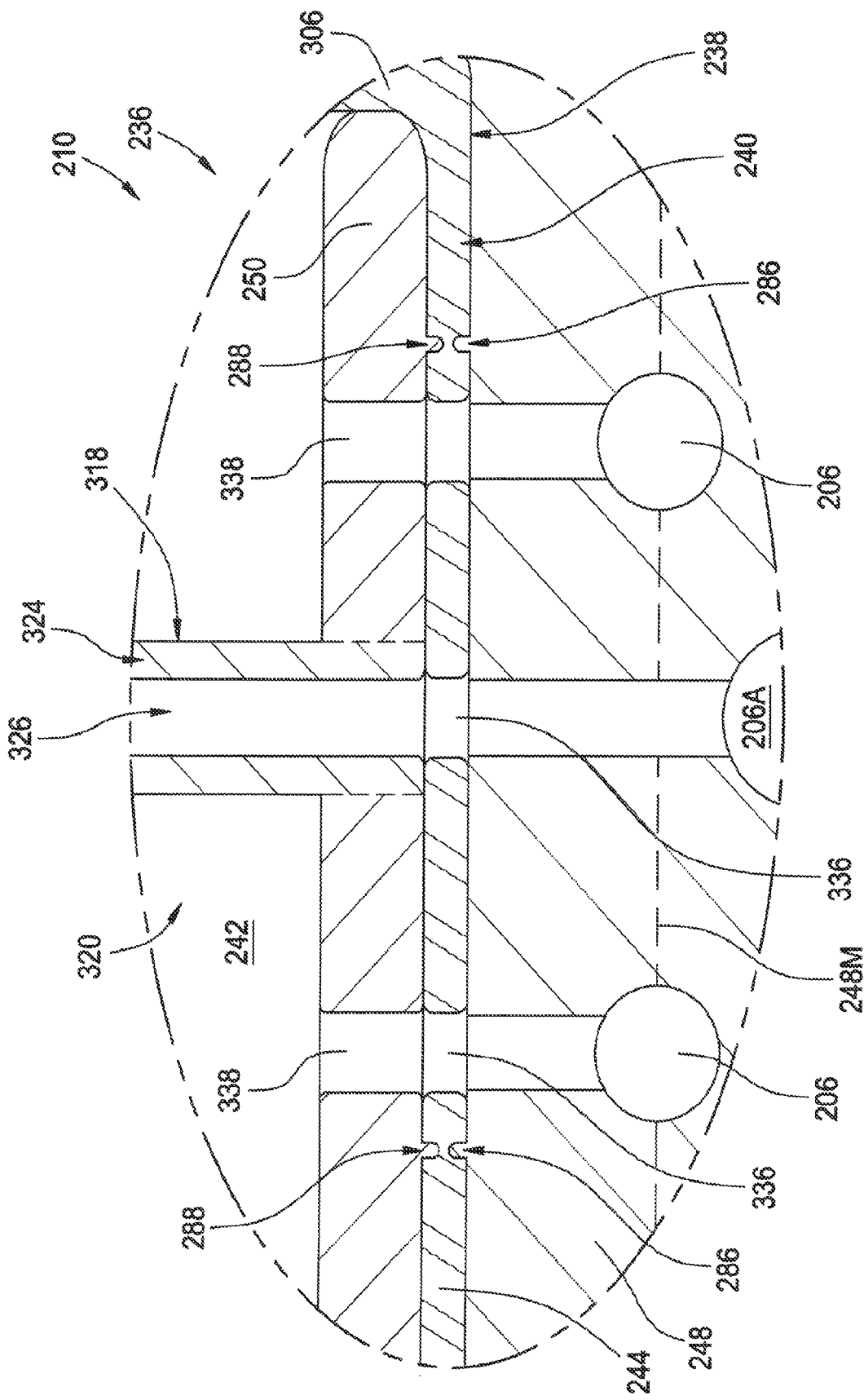
FIG. 9 is an enlarged view of the portion of the mold assembly and exemplary less-than-fully-cured non-pneumatic tire identified as Detail 9 in FIG. 7.

In the arrangements shown in FIGS. 6-11, bladders 238 include a bladder wall 240 that at least partially defines a bladder chamber 242. Bladder walls 240 are at least partially formed from elastomeric material, such as a fully cured (e.g., vulcanized) natural and/or synthetic rubber. Bladder wall 240 includes an end wall portion 244 and an end wall portion 246 that is spaced axially from end wall portion 244. As discussed above, the end wall portions 244 and 246 of each one of bladders 238 can be secured on or along mold section 202 or on or along mold section 204. As a non-limiting example, mold section 202 can include a base wall portion 248 that can at least partially include and/or otherwise be disposed in fluid communication with conduits 206, such as by way of two or more manifold walls or wall portions that are assembled together as is represented in FIGS. 7 and 9 by dashed lines 248M. End wall portion 244 is secured on or along base wall portion 248 with end wall portion 246 supported in axially-spaced relation to the base wall portion and to end wall portion 244, such that bladder chamber 242 is at least partially disposed between end wall portions 244 and 246.

Curing bladder assemblies 236 include a clamping plate 250 disposed within bladder chamber 242 that is positioned along end wall portion 244. Clamping plate 250 is secured to base wall portion 248 such that one or more parts 244P of end wall portion 244 is/are captured between clamping plate 250 and base wall portion 248. Curing bladder assemblies 236 also include a clamping plate 252 that is disposed within bladder chamber 242 and is positioned along end wall portion 246. A clamping plate 254 is positioned along end wall portion 246 outside of the bladder chamber opposite clamping plate 252 and is secured thereto such that one or more parts 246P of end wall portion 246 is/are captured between clamping plates 252 and 254.

It will be appreciated that end wall portions 244 and 246 can be supported in spaced relation to one another on or along the base wall portion in any suitable manner. For example, an elongated connecting member 256 can be operatively secured between base wall portion 248 and clamping plate 254. An elongated connecting member 258 can be disposed between clamping plates 250 and 252 to establish and maintain a pre-determined distance therebetween. In some cases, connecting members 256 and 258 can be axially coextensive and/or coaxial with one another, such as is shown in FIGS. 6, 8, 10 and 11, for example. In some cases, connecting member 256 can extend axially between ends 260 and 262 respectively disposed toward base wall portion 248 and clamping plate 254. Clamping plates 250, 252 and 254 can include one or more securement holes extending therethrough, such as are respectively identified by reference numbers 264, 266 and 268. Additionally, base wall portion 248 can include securement holes 270 extending therethrough. Clamping plates 250, 252 and 254 are positioned such that securement holes 264, 266 and 268 are at least approximately co-axially aligned with one another and with securement holes 270 such that end 260 of connecting members 256 extend through at least holes 264 and 270 and end 262 extends through at least holes 266 and 268. In some cases, either or both of ends 260 and/or 262 can include one or more helical threads. In which case, a securement device 272, such as a threaded nut, for example, can be operatively secured to end 260 and/or end 262.

In some cases, end wall portion 244 can include one or more holes 274 extending axially therethrough and through which end 260 of connecting members 256 can extend as the end of the connecting members pass through holes 264 and 270 of clamping plate 250 and base wall portion 248. Additionally, or in the alternative, end wall portion 246 can include one or more holes 276 extending axially therethrough and through which end 262 of connecting members 256 can extend as the end of the connecting members pass through holes 266 and 268 of clamping plates 252 and 254. A seal 278 can be operatively disposed between connecting member 258 and clamping plate 250 fluidically isolating bladder chamber 242 from holes 264 in clamping plate 250 and/or holes 274 in end wall portion 244. Additionally, or in the alternative, a seal 280 can be operatively disposed between connecting member 258 and clamping plate 252 fluidically isolating bladder chamber 242 from holes 266 in clamping plate 252 and/or holes 276 in end wall portion 246.

Figure 10:
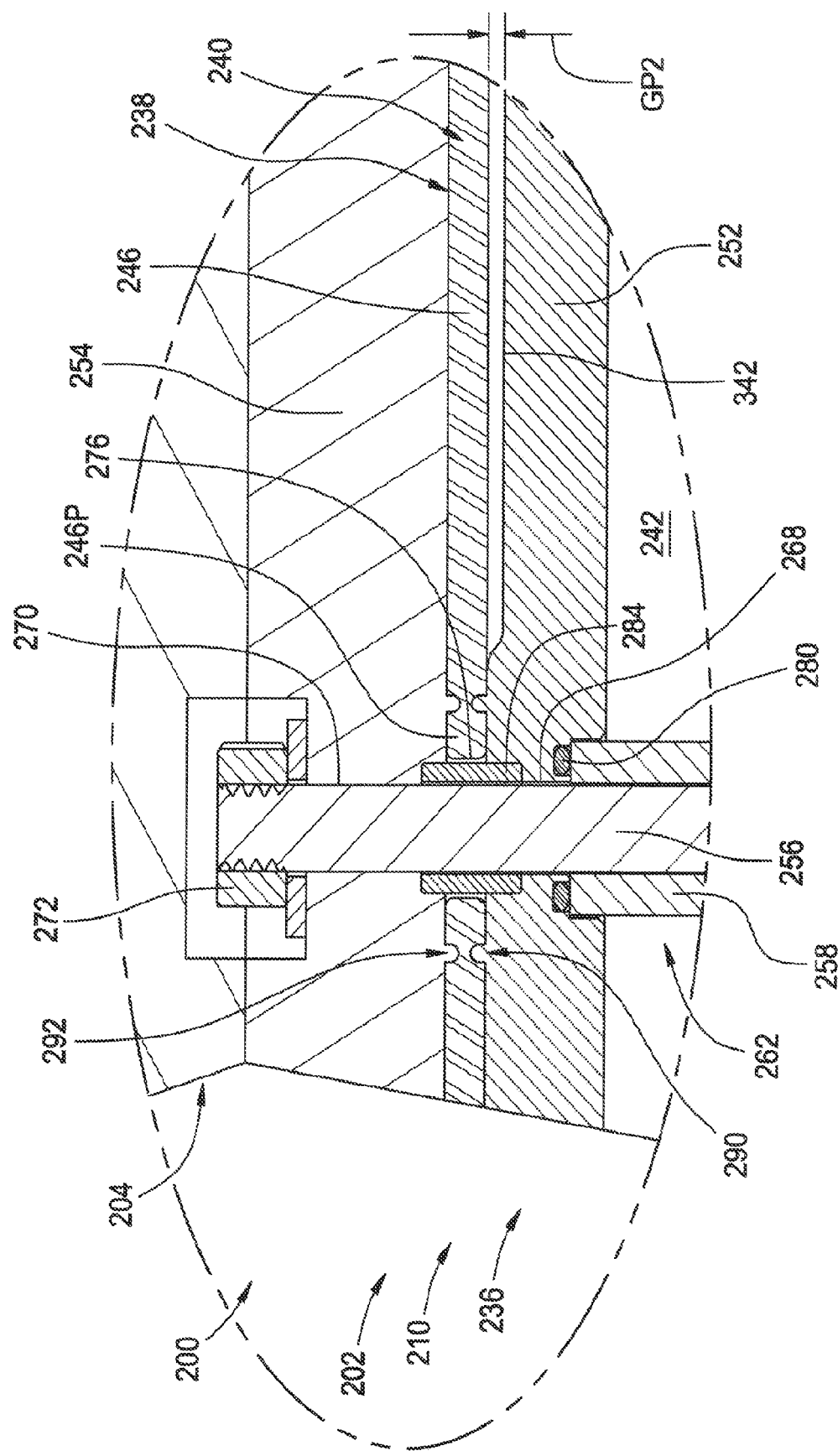
FIG. 10 is an enlarged view of the portion of the mold assembly and exemplary less-than-fully-cured non-pneumatic tire identified as Detail 10 in FIG. 8.
Figure 11:
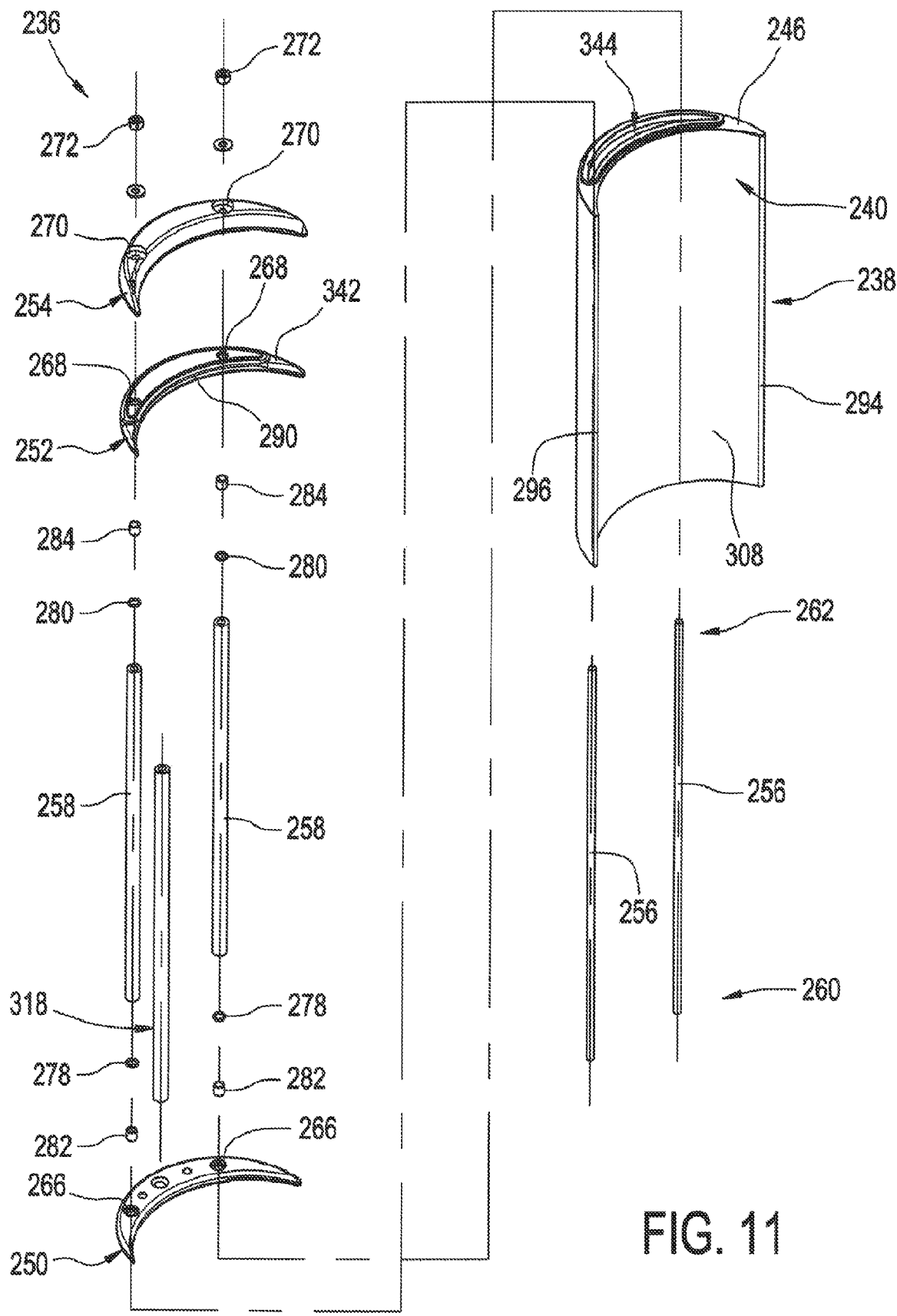
FIG. 11 is an exploded top perspective view of one example of a curing bladder assembly in accordance with the subject matter of the present disclosure, such as is shown in FIGS. 6-10, for example.

It will be recognized and appreciated that in the exemplary arrangements shown and described herein, end wall portion 244 of bladder wall 240 is positioned between base wall portion 248 and clamping plate 250 such that end wall portion 244 is compressed between the base wall portion and the clamping plate as the clamping plate is secured to the base wall portion. Similarly, end wall portion 246 of bladder wall 240 is positioned between clamping plates 252 and 254 such that the end wall portion is compressed between the clamping plates as the clamping plates are secured together. To generate and maintain a desired compression of end wall portion 244 and/or end wall portion 246, curing bladder assemblies 236 can include one or more compression restrictors with a length that establishes an approximate compression amount or limit of the associated end wall portion. As shown in FIGS. 8, 10 and 11, curing bladder assemblies 236 can include compression restrictors 282 extending through holes 274 in end wall portion 244 and positioned between base wall portion 248 and clamping plate 250. Additionally, or in the alternative, curing bladder assemblies 236 can include compression restrictors 284 extending through holes 276 in end wall portion 246 and disposed between clamping plates 252 and 254.

As discussed above, one or more parts 244P of end wall portion 244 can, in some cases, be captured between base wall portion 248 and clamping plate 250, such as to form a substantially fluid-tight seal therewith and/or to substantially inhibit lateral stretching and recovery (i.e., in a direction lateral to mold axis MAX) of part 244P of the end wall portion. Additionally, or in the alternative, one or more parts 246P of end wall portion 246 can, in some cases, be captured between clamping plates 252 and 254, such as to form a substantially fluid-tight seal therewith and/or to substantially inhibit lateral stretching and recovery (i.e., in a direction lateral to mold axis MAX) of part 246P of the end wall portion. In some cases, base wall portion 248 can include one or more projections 286 extending axially outward toward clamping plate 250. In other cases, clamping plate 250 can include one or more projections 288 extending axially outward therefrom in a direction toward base wall portion 248. In some cases, both projections 286 and projections 288 can be used and disposed in approximate alignment with one another such that a portion of end wall portion 244 is captured or otherwise clamped therebetween. Additionally, or in the alternative, clamping plate 252 can, in some cases, include one or more projections 290 extending axially outward therefrom in a direction toward clamping plate 254. In other cases, clamping plate 254 can include one or more projections 292 extending axially outward therefrom in a direction toward clamping plate 252. In some cases, both projections 290 and projections 292 can be used and disposed in approximate alignment with one another such that a portion of end wall portion 246 is captured or otherwise clamped therebetween.

It will be appreciated that bladder 238 can be of any suitable size, shape and/or configuration that is cooperative with the configuration and/or arrangement of walls, wall portions and spaces of structure body 108, such as inner layer 124, outer layer 126, support structures 140 and/or spaces 156, for example. Bladder walls 240 can also include an edge wall portion 294 and an edge wall portion 296 that is offset radially outward from edge wall portion 294. Edge wall portions 294 and 296 extend axially from along end wall portion 244 toward end wall portion 246, and have curved cross-sectional profiles taken transverse to mold axis MAX. Edge wall portion 294 includes an outer surface portion 298 with a convex shape and an inner surface portion 300 with a concave shape. Edge wall portion 296 includes an outer surface portion 302 with a convex shape and an inner surface portion 304 with a concave shape. Inner surface portions 300 and 304 at least partially define bladder chamber 242. In a preferred arrangement, edge wall portions 294 and 296 inflate or otherwise expand during actuation and substantially conform to end surface portion 158 of portion 156 of the inner layer and end surface portion 162 of portion 160 of the outer layer.

Bladder walls 240 can further include a side wall portion 306 and a side wall portion 308 that is spaced laterally from side wall portion 306. Side wall portions 306 and 308 extend axially from along end wall portion 244 toward end wall portion 246. Side wall portions 306 and 308 also extend laterally between edge wall portions 294 and 296, and can have curved cross-sectional profiles taken transverse to mold axis MAX. Side wall portion 306 includes an outer surface portion 310 with a convex shape and an inner surface portion 312 with a concave shape that at least partially defines bladder chamber 242. Side wall portion 308 includes an outer surface portion 314 with a concave shape and an inner surface portion 316 with a concave shape that at least partially defines bladder chamber 242. As such, bladders 238 can, in some cases, have a crescent-shaped cross-sectional configuration taken transverse to mold axis MAX.

As discussed above, curing bladder assemblies 236 are actuated by introducing pressurized and/or heated fluid into bladder chambers 242 of bladders 238, such as from pressurized fluid source PFS and/or heated fluid source HFS, for example, by way of conduits 206. It will be appreciated that mold assembly 200, interstitial curing system 210 and/or curing bladder assemblies 236 can include any combination of features and/or components operable to promote transfer of pressurized and/or heated fluid into and/or out of bladder chambers 242. As a non-limiting example, curing bladder assemblies 236 can include a transfer tube 318 that extends longitudinally from an end 320 that is secured to base wall portion 248 and/or clamping plate 250 to an end 322 that is disposed within bladder chamber 242 toward clamping plate 252. Transfer tube 318 can include a tube wall 324 that at least partially defines a tube passage 326 disposed in fluid communication with a conduit 206A along end 320 and bladder chamber 242 along end 322. In some cases, tube wall 324 can include notches or other end relief features 328 extending into the tube wall from an end surface portion 330 thereof, such as may be suitable for ensuring fluid communication between bladder chamber 242 and tube passage 326 in cases in which end surface portion 330 is disposed close to or in abutting engagement with clamping plate 250, such as is represented in FIG. 7 by arrows FCM.

In transitioning curing bladder assemblies 236 into an actuated condition, pressurized and/or heated fluid 332 is transferred into bladder chambers 242, such as by way of conduits 206, for example. To promote rapid and/or full transfer of fluid 332 into the bladder chambers, existing fluid 334 contained within the bladder chambers (e.g., air, steam), such as that shown as being above fluid level FLV in FIG. 7, for example, can be approximately simultaneously evacuated from bladder chambers 242 through tube passage 326, such as by way of conduit 206A, for example, which can be disposed in fluid communication with vacuum source VCS and/or another fluid transfer system.

As pressurized and/or heated fluid 332 is transferred into bladder chambers 242, bladders 238 expand such that outer surface portions 298, 302, 310 and 314 apply pressure to walls and/or wall portions of structure body 108, such as inner layer 124, outer layer 126 and/or support structures 140, for example. In such an actuated or otherwise pressurized condition, which is represented in FIGS. 7 and 8 by dashed lines ACT, heat can be transferred into the less-than-fully-cured elastomeric material of at least structure body 108 and/or tread body 112 for a predetermined period of time by way of conduction through bladder wall 240 and/or other thermally-conductive walls and/or wall portions of mold sections 202 and/or 204. Once the predetermined curing time has been reached and the less-than-fully-cured material of the non-pneumatic tire has been fully or otherwise substantially-entirely cured, at least some of the pressurized and/or heated fluid can be relieved or otherwise drawn out of bladder chambers 242. In some cases, de-actuating curing bladder assemblies 236 can include pressurized fluid source PFS, heated fluid source HFS and/or vacuum source VCS generating a reduced pressure condition within bladder chamber 242 thereby allowing bladder wall 240 to return to an uninflated or at least less-than-fully-inflated condition and/or drawing bladder wall 240 into a collapsed state, such as is represented in FIGS. 7 and 8 by dashed lines DEA and may provide for easier loading and/or unloading of non-pneumatic tire 100, for example.

It will be appreciated that pressurized and/or heated fluid 332 can be transferred into bladder chambers 242 and that existing fluid 334, pressurized and/or heated fluid 332 and/or any condensate therefrom can be transferred out of bladder chambers 242 in any suitable manner. As one non-limiting example, end wall portions 244 of bladder wall 240 can include one or more passages 336 extending therethrough in fluid communication with conduits 206 and/or 206A of base wall portion 248 in mold section 202. In such arrangements, clamping plates 250 can include one or more passages 338 extending therethrough in fluid communication with passages 336 in the end wall portion of the bladder wall. In some cases, passages 336 and/or 338 can be disposed in direct fluid communication with bladder chambers 242. In other cases, one or more of passages 336 and/or 338 can be disposed in fluid communication with tube passages 326. As such, it will be appreciated that any suitable configuration and/or arrangement can be used without departing from the subject matter of the present disclosure.

It will be appreciated that the remaining parts of end wall portions 244 and/or 246 of bladder wall 240 that are outside of or otherwise apart from parts 244P and/or 246P will expand and recover as bladders 238 are actuated and de-actuated, as described above. As such, clamping plate 250 and/or clamping plate 252 can include one or more offset surface portions, such as are identified in FIGS. 8 and 10 by reference numbers 340 and/or 342, respectively. Offset surface portions 340 can be disposed on or along clamping plates 250 in facing relation to end wall portions 244 such that a space or gap in an axial direction is formed between end wall portion 244 and offset surface portions 340, as is represented in FIG. 8 by reference dimension GP1. Additionally, or in the alternative, offset surface portions 342 can be disposed on or along clamping plates 252 in facing relation to end wall portions 246 such that a space or gap in an axial direction is formed between end wall portion 246 and offset surface portions 342, as represented in FIG. 10 by reference dimension GP2. Bladder wall 240 can also include an opening 344 along one of end wall portions 244 and 246 through which clamping plates 250 and/or 252 as well as other components of bladder assembly 236 can be inserted into bladder chamber 242.

Figure 12:
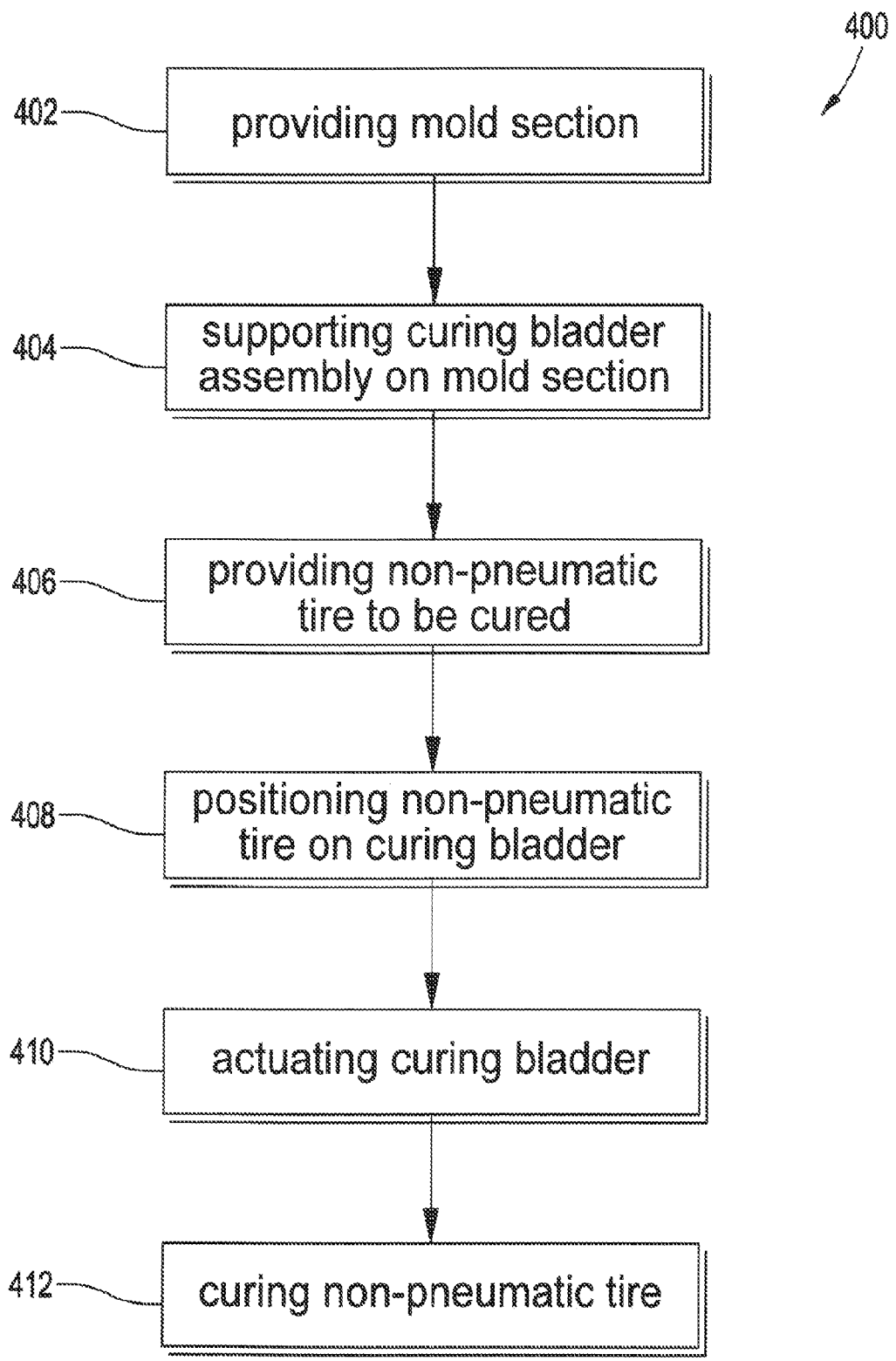
FIG. 12 is a graphical representation of one example of a method of manufacture in accordance with the subject matter of the present disclosure.

A method 400 of manufacturing in accordance with the subject matter of the present disclosure of manufacturing a non-pneumatic tire is shown in FIG. 12 can include providing a mold section having mold axis MAX, such as one of mold sections 202 and 204, for example, as is represented in FIG. 12 by reference number 402. Method 400 can also include supporting one or more curing bladder assemblies, such as curing bladder assemblies 236, for example, on the mold section in radially-offset relation to mold axis MAX, such as is represented in FIG. 12 by reference number 404. In a preferred arrangement, a plurality of curing bladder assemblies 236 will be disposed in spaced relation to one another about mold axis MAX to at least partially form interstitial curing system 210. Method 400 can further include providing less-than-fully-cured non-pneumatic tire 100 and positioning the less-than-fully-cured non-pneumatic tire on or along the mold section in an axially coextensive arrangement with the one or more curing bladder assemblies, such as is represented in FIG. 12 by reference numbers 406 and 408, respectively. Method 400 can also include actuating the one or more curing bladder assemblies and then curing the non-pneumatic tire, such as is represented in FIG. 12 by reference numbers 410 and 412, respectively.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A method of manufacturing a non-pneumatic tire assembly, said method comprising:
    providing a first mold section that includes a longitudinally-extending mold axis;
    supporting a first curing bladder assembly on said first mold section in radially-offset relation to said mold axis with said first curing bladder assembly including a first bladder wall at least partially formed from elastomeric material and said first bladder wall at least partially defining a first bladder chamber, said first bladder wall including:
        a first end wall portion disposed along said first mold section and a second end wall portion spaced longitudinally from said first end wall portion;
        a first edge wall portion extending longitudinally between said first and second end wall portions and a second edge wall portion extending longitudinally between said first and second end wall portions in spaced relation to said first edge wall portion; and,
        first and second side wall portions extending longitudinally between said first and second end wall portions and laterally between said first and second edge wall portions with said first side wall portion including a first outer side surface portion having a concave cross-sectional profile and said second side wall portion including a second outer side surface portion having a convex cross-sectional profile;
    providing a less-than-fully-cured non-pneumatic tire assembly that includes a plurality of support structures disposed in peripherally-spaced relation to one another and a plurality of spaces disposed in peripherally-spaced relation to one another with one of said plurality of spaces between adjacent ones of said plurality of support structures;
    positioning said less-than-fully-cured non-pneumatic tire assembly along said first mold section such that said first curing bladder assembly is disposed within one of said plurality of spaces and axially coextensive with at least a portion of said less-than-fully-cured non-pneumatic tire assembly;
    inflating said first curing bladder assembly and thereby displacing at least said first edge wall portion and said second edge wall portion outward into engagement with and applying pressure to said less-than-fully-cured non-pneumatic tire assembly; and,
    curing said non-pneumatic tire assembly.

2. A method according to claim 1, wherein inflating said first curing bladder assembly includes introducing a quantity of pressurized fluid into said first bladder chamber.

3. A method according to claim 2, wherein introducing said quantity of pressurized fluid includes introducing pressurized and heated fluid into said first bladder chamber.

4. A method according to claim 1, wherein curing said non-pneumatic tire assembly includes heating and applying pressure to said less-than-fully-cured non-pneumatic tire assembly.

5. A method according to claim 1, wherein curing said non-pneumatic tire assembly includes introducing steam into said first bladder chamber.

6. A method according to claim 1, wherein supporting said first curing bladder assembly on said first mold section includes:
    positioning a first end plate within said first bladder chamber along said first end wall portion; and,
    capturing a first part of said first end wall portion between said first end plate and said first mold section such that said first part of said first end wall portion is laterally constrained during inflation of said first curing bladder assembly with a second part of said first end wall portion laterally displaceable during inflation of said first curing bladder assembly.

7. A method according to claim 6, wherein supporting said first curing bladder assembly on said first mold section includes:
    positioning a second end plate within said first bladder chamber along said second end wall portion and a third end plate along said second end wall portion opposite said second end plate; and,
    capturing a first part of said second end wall portion between said second and third end plates such that said first part of said second end wall portion is laterally constrained during inflation of said first curing bladder assembly with a second part of said second end wall portion laterally displaceable during inflation of said first curing bladder assembly.

8. A method according to claim 7, wherein positioning said second end plate within said first bladder chamber includes supporting said second end plate on said first end plate and securing said second end plate at a substantially fixed distance from said first end plate.

9. A method according to claim 1, wherein:
supporting said first curing bladder assembly on said first mold section includes supporting a plurality of curing bladder assemblies on said first mold section in peripherally-spaced relation to one another about said mold axis; and,
positioning said less-than-fully-cured non-pneumatic tire assembly along said first mold section includes positioning said less-than-fully-cured non-pneumatic tire assembly along said first mold section such that each of said plurality of curing bladder assemblies is disposed within a different one of said plurality of spaces.

10. A method according to claim 9, wherein inflating said first curing bladder assembly includes approximately simultaneously inflating said plurality of curing bladder assemblies such that said first side wall portion of each of said plurality of curing bladder assemblies abuttingly engages a different one of said plurality of support structures of said less-than-fully-cured non-pneumatic tire assembly and said second side wall portion of each of said plurality of curing bladder assemblies abuttingly engages a different one of said plurality of support structures thereby compressing each of said plurality of support structures between adjacent ones of said plurality of curing bladder assemblies.

11. A method according to claim 1, wherein providing said less-than-fully-cured non-pneumatic tire assembly includes:
providing a first annular ring having a longitudinal axis, said first annular ring extending axially between a first first ring end and a second first ring end spaced axially from said first first ring end, said first annular ring including a first ring outer surface portion facing radially outward and disposed between said first first ring end and said second first ring end; and,
applying a first layer of less-than-fully-cured elastomeric material along at least said first ring outer surface portion of said first annular ring.

12. A method according to claim 11, wherein providing said less-than-fully-cured non-pneumatic tire assembly includes:
providing a second annular ring extending axially between a first second ring end and a second second ring end spaced axially from said first second ring end, said second annular ring including a second ring inner surface portion facing radially inward and disposed between said first second ring end and said second second ring end; and,
applying a second layer of less-than-fully-cured elastomeric material along at least said second ring inner surface portion of said second annular ring.

13. A method according to claim 12, wherein providing said less-than-fully-cured non-pneumatic tire assembly includes positioning said second annular ring concentrically and coextensively with at least a portion of said first annular ring.

14. A method according to claim 13, wherein providing said less-than-fully-cured non-pneumatic tire assembly includes providing a plurality of support structures with each of said plurality of support structures including a first support structure edge, a second support structure edge opposite said first support structure edge, a first support structure end and a second support structure end opposite said first support structure end.

15. A method according to claim 14, wherein providing said less-than-fully-cured non-pneumatic tire assembly includes positioning said plurality of support structures in peripherally-spaced relation to one another about said longitudinal axis of said first annular ring such that said first support structure ends are spaced apart from one another along said first layer of less-than-fully-cured elastomeric material and such that said second support structure ends are spaced apart from one another along said second layer of less-than-fully-cured elastomeric material.

16. A mold assembly for curing non-pneumatic tires, said mold assembly comprising:
a first mold section having a mold axis and dimensioned to receive an associated less-than-fully-cured non-pneumatic tire assembly;
a first curing bladder assembly supported on said first mold section in radially-offset relation to said mold axis with said first curing bladder assembly including a first bladder wall at least partially formed from elastomeric material, said first bladder wall at least partially defining a first bladder chamber and including:
a first end wall portion disposed along said first mold section and a second end wall portion spaced longitudinally from said first end wall portion;
a first edge wall portion extending longitudinally between said first and second end wall portions and a second edge wall portion extending longitudinally between said first and second end wall portions in spaced relation to said first edge wall portion; and,
first and second side wall portions extending longitudinally between said first and second end wall portions and laterally between said first and second edge wall portions with said first side wall portion including a first outer side surface portion having a concave cross-sectional profile and said second side wall portion including a second outer side surface portion having a convex cross-sectional profile.

17. A mold assembly according to claim 16 further comprising a first end plate disposed within said first bladder chamber along said first end wall portion, said first end plate secured to said first mold section such that a first part of said first end wall portion is compressively captured between said first end plate and said first mold section with a second part of said first end wall portion freely laterally displaceable relative to said first part of said first end wall portion.

18. A mold assembly according to claim 17 further comprising a second end plate disposed within said first bladder chamber along said second end wall portion and a third end plate supported along said second end wall portion opposite said second end plate, said second and third end plates secured together such that a first part of said second end wall portion is compressively captured between said second and third end plates with a second part of said second end wall portion freely laterally displaceable relative to said first part of said second end wall portion.

19. A mold assembly according to claim 18, wherein said second end plate is secured to said first end plate in a substantially fixed axial position relative to said first end plate.

20. A mold assembly according to claim 16, wherein said first curing bladder assembly is one of a plurality of curing bladder assemblies secured on said first mold section in peripherally-spaced relation to one another about said mold axis.

* * * * *